B. HAGELE.
LABELING MACHINE.
APPLICATION FILED NOV. 14, 1918.
1,330,261.
Patented Feb. 10, 1920.
4 SHEETS—SHEET 1.
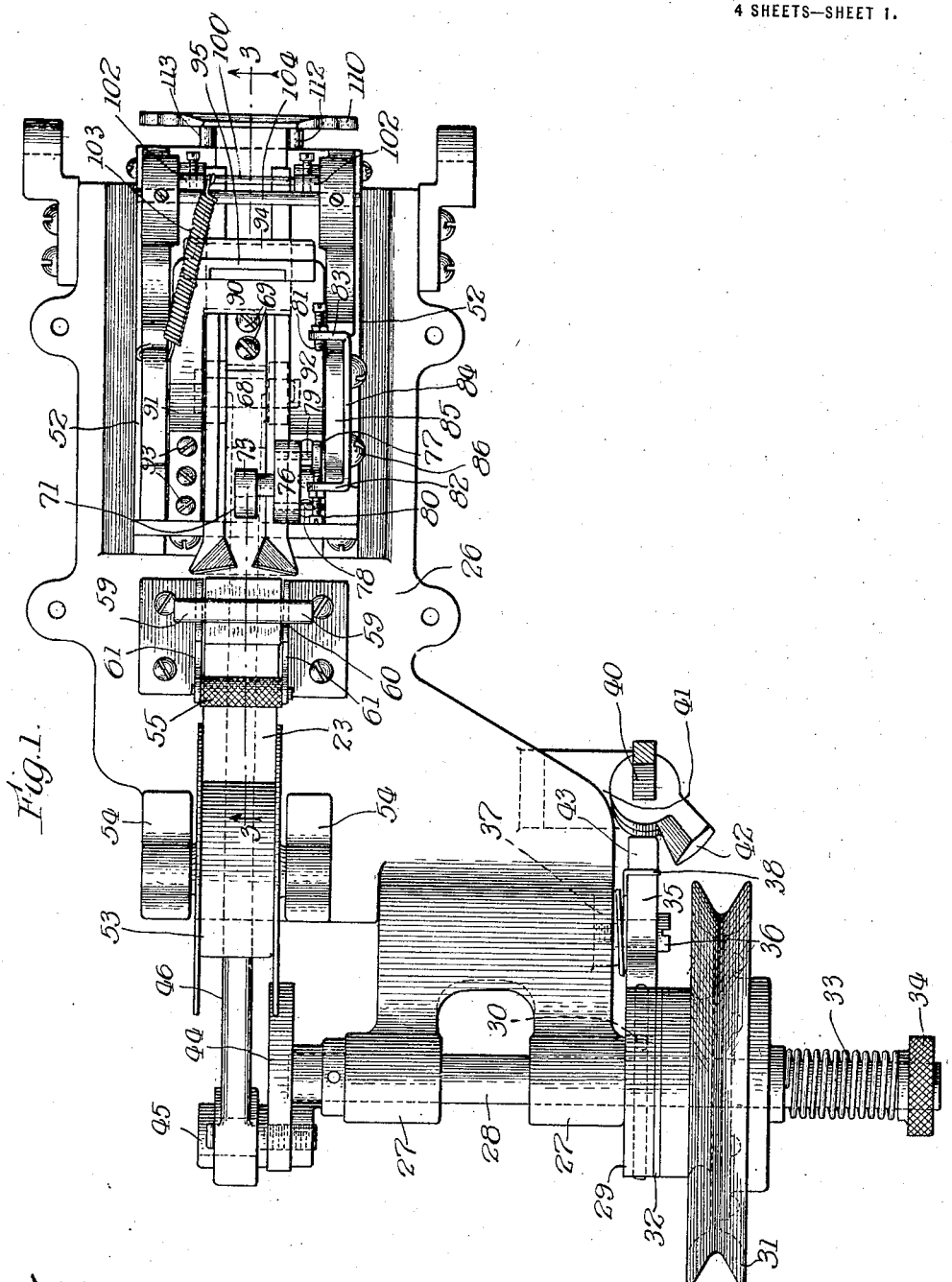

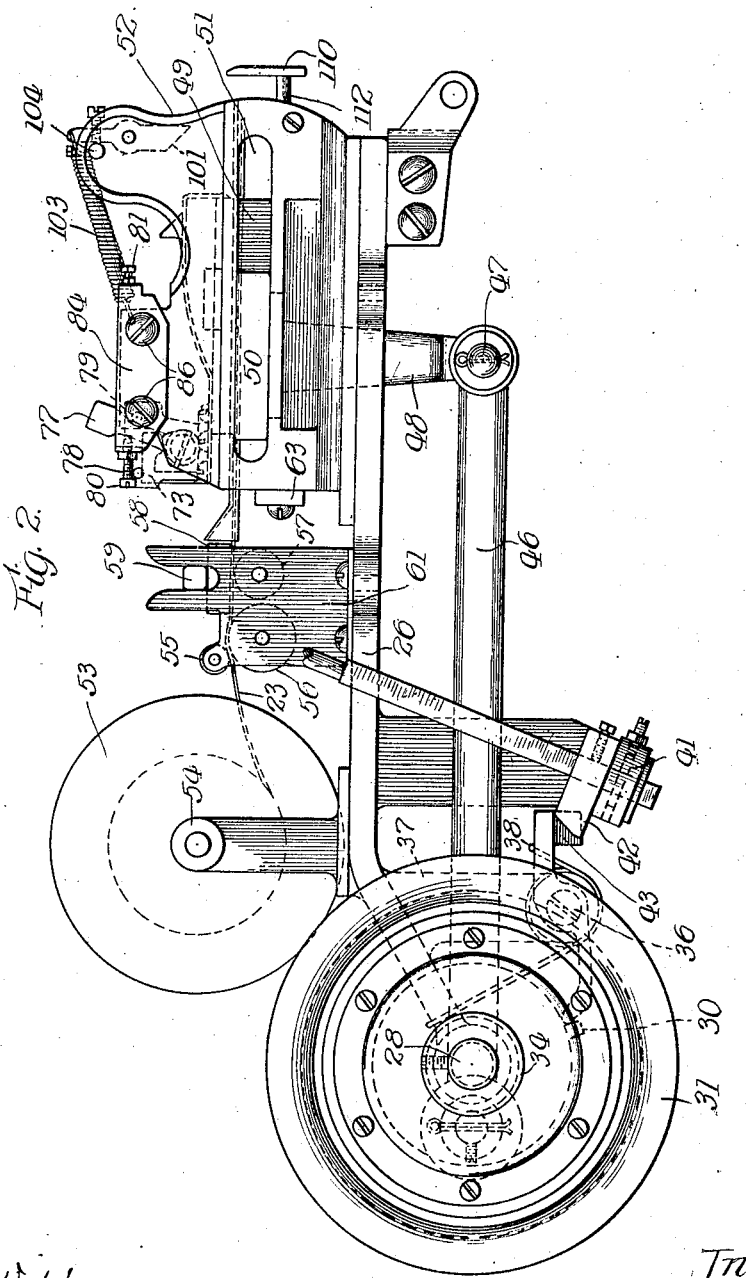

B. HAGELE.
LABELING MACHINE.
APPLICATION FILED NOV. 14, 1918.
1,330,261.
Patented Feb. 10, 1920.
4 SHEETS—SHEET 3.
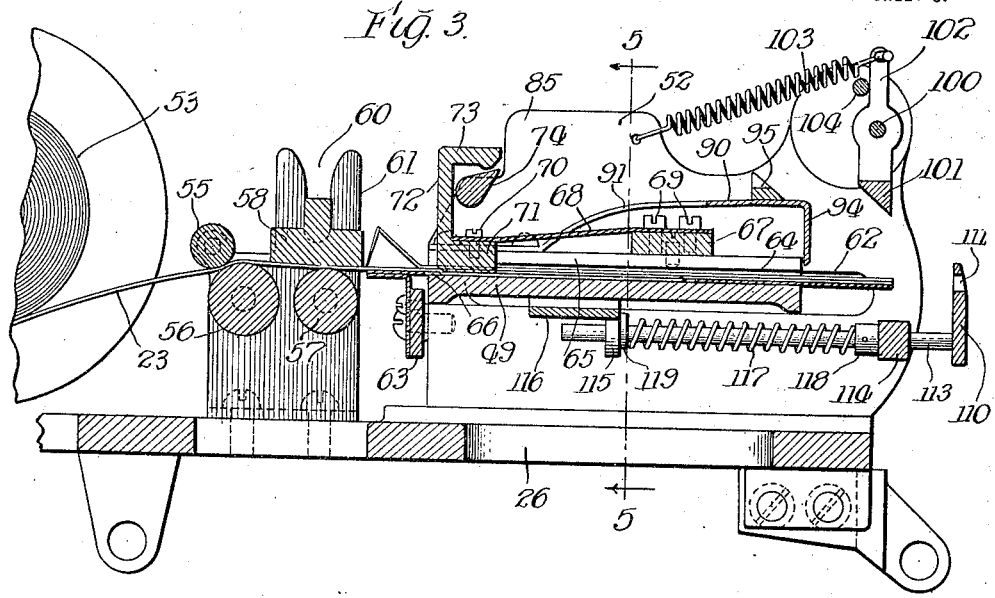
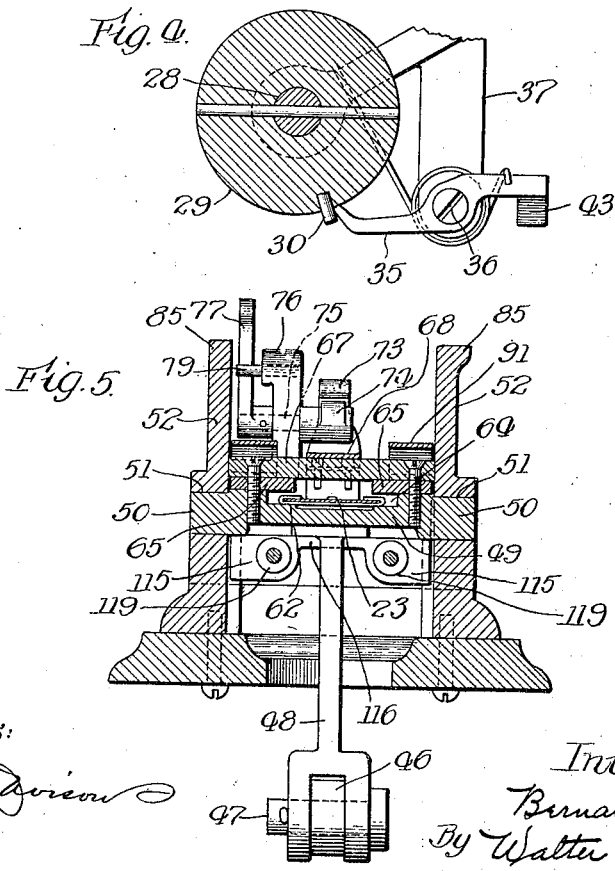
Witness:
Inventor:
Bernard Hagele
By Walter M. Fuller
Atty.

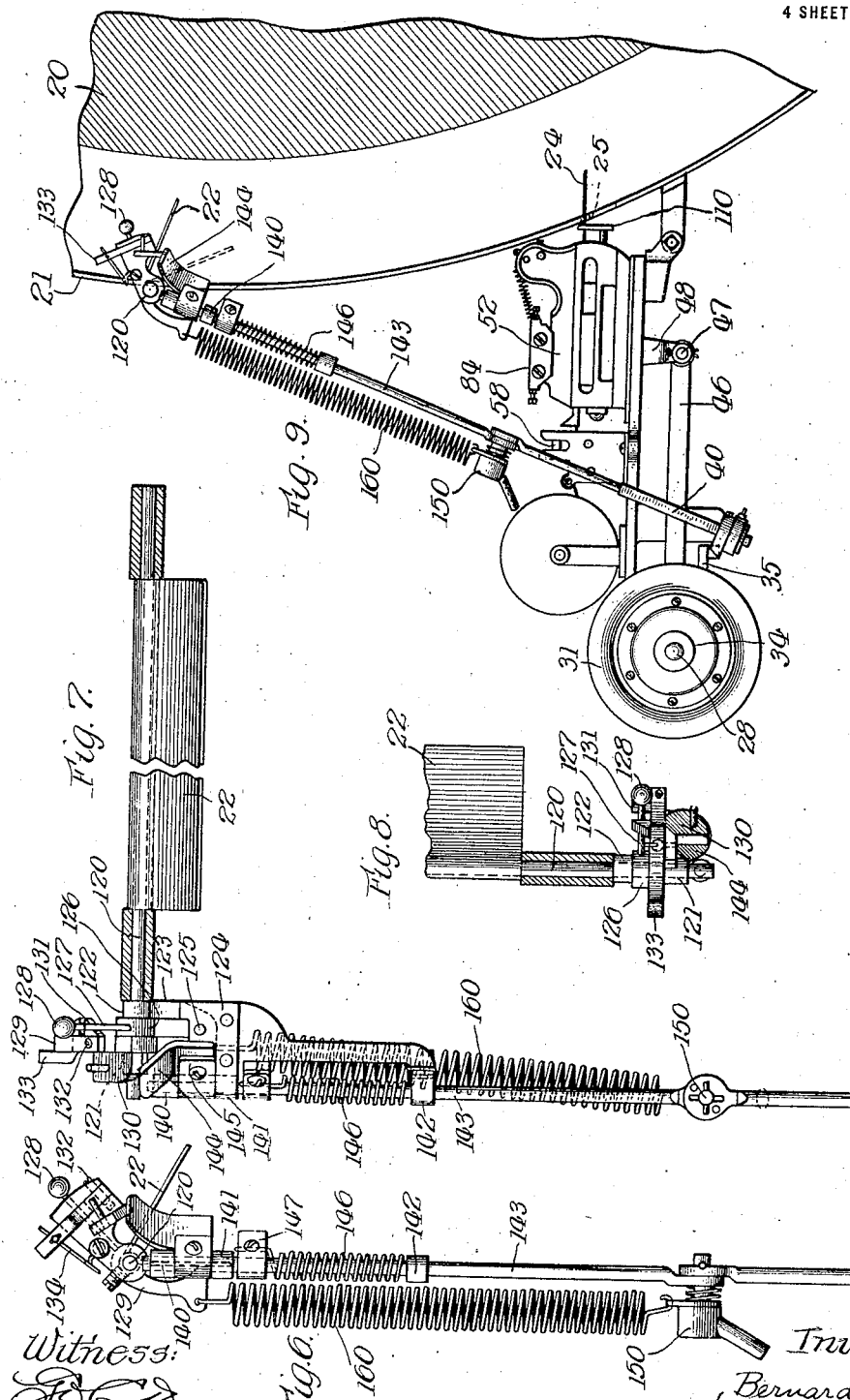
B. HAGELE.
LABELING MACHINE.
APPLICATION FILED NOV. 14, 1918.
1,330,261. Patented Feb. 10, 1920.
4 SHEETS—SHEET 4.

UNITED STATES PATENT OFFICE.

BERNARD HAGELE, OF SPRINGFIELD, ILLINOIS.

LABELING-MACHINE.

1,330,261.  Specification of Letters Patent.  Patented Feb. 10, 1920.

Application filed November 14, 1918. Serial No. 262,424.

*To all whom it may concern:*

Be it known that I, BERNARD HAGELE, a citizen of the United States, residing at Springfield, in the county of Sangamon and State of Illinois, have invented certain new and useful Improvements in Labeling-Machines, of which the following is a specification.

My invention pertains to label-affixing appliances and concerns more particularly, but not exclusively machines of this type or character for applying labels to batches of dough before baking, such, for example, as the pieces of dough for loaves of bread, no paste, glue, or the like being employed, the natural adhesive properties of the dough itself being sufficient for adequate securing of the label in position.

In the preferred embodiment of the invention, the device takes the form of an attachment or addition for an ordinary dough-molding machine, comprising the usual and customary revolving drum and the associated encircling or surrounding band or shell between which the dough passes and by which it is properly molded. The auxiliary labeling apparatus is power operated and so constructed that each batch of dough controls and governs the feeding of a continuous strip of labels and the severance of the foremost one for application to that particular body of dough, whereby, if the travel of the batches is temporarily interrupted, such a properly-timed cessation of the feeding and cutting off of labels will occur, that none are wasted and the apparatus does not become clogged by reason of improper and unnecessary operation of the device.

The prime and leading object of the invention and one of its salient features is the provision of a label-affixing apparatus of this character which, because of its simplicity in structure, is economical to manufacture, which is unlikely to become deranged or injured in service, which feeds, cuts, and applies the labels with certainty and effectiveness, which wastes no labels, and which requires but little attention to assure continuous, efficient, and reliable operation. These and various other objects and aims are accomplished or attained in the employment of a device incorporating this invention, which, it should be understood, is susceptible of a variety of embodiments and is not, therefore, limited and restricted in its successful commercial application to the special features of structure and function of any one particular concrete example of the invention in physical form.

In order that those skilled in this art may have a full and complete understanding of the invention and its various advantages both from a structural and functional standpoint I have illustrated in the accompanying drawings, forming a part of this specification and throughout the various views of which like reference characters refer to the same parts, a preferred and desirable embodiment of the invention.

In these drawings,

Figure 1 is a plan view of the main portion of the apparatus;

Fig. 2 is an elevation of the same;

Fig. 3 is a longitudinal vertical section on line 3—3 of Fig. 1;

Fig. 4 is a fragmentary vertical detailed section showing the clutch controlling mechanism;

Fig. 5 is a vertical cross-section on line 5—5 of Fig. 3;

Figs. 6, 7 and 8 are views of the trip mechanism governing the action of the label feeding and severing part of the apparatus, Figs. 6 and 7 being illustrations at right-angles to one another, and Fig. 8 a fragmentary plan view; and Fig. 9 shows in a general way the association of this improved device with a dough-molding machine.

Referring first to Fig. 9 it will be seen that the labeling apparatus is so connected to or combined with an ordinary molding-machine comprising a rotary drum 20 and its associated spaced band 21, that the trip or trigger 22 of the appliance is disposed in the annular space between the two parts of the molder, whereby it will be subject to actuation by the individual batches of dough as they pass along through the molder, such trip member effecting the feed and severance from a continuous strip 23 of labels of the foremost label 24 so that it will be introduced through an aperture 25 in the band of the molder into the path of travel of the body of dough to which it automatically becomes adhered by reason of the adhesiveness of the dough itself. If the feed of the dough ceases, the appliance will not be tripped and no labels will be fed or cut off.

Turning now to the label advancing and severing part of the apparatus, it will be seen that it includes a suitably-supported base-plate 26 having alined, transversely-disposed, bearings 27, 27 for an intermittently-actuated shaft 28 having a collar 29 pinned or otherwise fixedly secured thereto, the collar having a short outstanding radial pin or lug 30 (Figs. 2 and 4) by means of which the shaft and collar are normally locked against turning. Loose and free to rotate on this shaft is a grooved pulley 31 constantly rotated in a counter-clockwise direction as viewed in Fig. 2 by a belt driven from any suitable source of power, conveniently from a pulley on the shaft (not shown) of the molder drum. The hub of such pulley has one face equipped with friction material 32 adapted to bear against the adjacent face of collar 29 and to rotate the latter and the shaft when permitted to do so. These parts are pressed together longitudinally of the shaft into friction driving relation by a coil expansion spring 33 encircling the shaft and bearing at one end against the hub of the pulley and at its other end against an adjustable abutment 34 held rigid with the shaft.

To prevent the shaft from turning, a lock-lever 35 is fulcrumed at 36 on a depending arm 37 of the base-plate and by means of a torsional spring 38 coiled around its fulcrum screw and looped around the lever and secured to the base-plate, the former is maintained elevated so that its end is in the path of circular travel of lug 30, its engagement with which prevents the shaft from rotating with the constantly-revolving pulley.

In order to trip or release this lock-lever, the machine is provided with a more or less upright shaft 40 square in cross-section revoluble in a swiveled bearing 41 on a downwardly-projecting part of the appliance, the shaft having a cam-arm 42 adapted to coact with a cam portion 43 of lever 35. Thus when cam 42 is swung inwardly it rocks lever 35, temporarily releasing lug 30, enabling the shaft and collar to make one complete revolution with the pulley by reason of the friction clutch construction. By the time lug 30 has completed such single revolution, cam 42 will have been rocked out of the way allowing lever 35 to be in normal position to engage the lug and inhibit further rotation thereof until again tripped. The means for oscillating the trip shaft 40 will be described hereinafter.

At its other end shaft 28 carries a disk 44 with a wrist-pin 45 on which is a connecting rod 46 pivoted at 47 to a depending arm 48 on a horizontal sliding carriage 49 guided in its reciprocations by lateral ears 50 sliding in slots 51 in a pair of upstanding brackets or supports 52, 52. This sliding carriage and the elements which it carries effects the feeding and severing of the labels from a roll or spool 53 of the continuous strip 23 of the same, the roll or spool being supported in notched uprights 54, 54 rising from the base. From the spool the paper strip passes between two conveniently-supported rollers 55, 56 with slightly roughened surfaces and then over a roller 57 against whose lightly knurled surface it is held by a weight 58 bearing thereon to prevent undue unrolling, the weight being free to be lifted out if occasion requires by being held in place by projections 59 thereon received in vertical slots 60 of uprights 61. Upon leaving the weight the paper tape passes through a flanged or oppositely-slotted elongated guide member 62 of substantial length mounted on a cross-bar 63 supported by fastening screws on the side pieces 52, 52. The forwardly extended part of this stationary guide member is accommodated in and supported by the bottom wall or floor of an undercut groove 64 in the top of the sliding carriage 49, the undercut feature being provided by two lengthwise plates or bars 65, 65 fastened to the top of the carriage and overlying the main body of the groove cut lengthwise in the top face. To facilitate the entrance of the paper strip to such guide when a new strip is being inserted its mouth toward the spool is flared or enlarged. As is shown in the various figures of the drawings this guide-member is of practically the same width as the paper strip and effectively guides it forwardly in its intermittent or interrupted travel, the member having its bottom wall between its two oppositely-disposed bent or grooved portions which receive and guide the edges of the paper cut away at 66 to expose the top surface of the slide or carriage beneath.

In order to clamp or grip the paper to the slide during its forward travel to advance it and to release such paper tape during the back movement of the slide, the following instrumentalities have been provided. On a cross-piece 67 mounted on the carriage above the side-bars 65, 65 the forward end of a leaf spring 68 is fastened by means of screws 69, 69, the rear end of the spring, by screws 70, 70, being secured to a shoe 71 adapted to bear on the top face of the paper ribbon to press it down and thus clamp or grip it to the slide, so that as the latter moves toward the molding machine it will advance the paper with it. To raise such shoe away from the paper during its retrograde movement and thus not interfere with the advanced paper, the shoe is equipped with a right-angled projection comprising a vertical post 72 and a forwardly-extended horizontal arm 73 at its top end. Coöperating with such arm, I provide a lifting or elevating cam 74 on a short transverse shaft 75 having a bearing in the lower part of a bracket 76 mounted on top of one of the side-plates 65 near its end adjacent to the paper spool or roll. Shaft 75 has an upright rock-arm 77 pinned thereto by means of which the cam-shaft is oscillated, spaced stop-pins 78 and 79 fixed to and projecting from the bracket 76 limiting its movements in opposite directions. During the reciprocations of the slide, bracket, arm, etc., the arm is rocked in opposite directions by means of stationary, opposed screws 80, 81, located in the path of travel of the upper part of the arm and adjustably mounted in the bent ends 82 and 83 of an inwardly-extended, horizontally-disposed, U-shaped bar 84 secured against the outer face of an upwardly-projecting portion 85 of one of the side-frames 52 by screws 86, 86.

Referring now to the severing or cutting-off mechanism of this appliance, it will be observed that a spring-plate 90 has two spaced legs 91 and 92 with spring action tending to rise fastened by screws 93, 93 on top of the sliding carriage side-bars 65, 65, one of the legs 92 being positioned between its corresponding side-bar and bracket 76. The other side of plate 90 is bent down to provide a knife-blade or cutter 94 with its lower horizontal edge sharpened. On top the plate 90 has a transverse cam-bar 95 fixed thereto in any approved manner. At the front end of the apparatus on a cross-shaft or rod 100 a cam-member 101 is rockingly hung by means of two parallel, upwardly-extended arms 102 apertured in register or alinement for the reception of the shaft. To the top of one of these arms one end of a coil contractile spring 103 is secured, the other end being fastened to the corresponding side-frame 52. Rocking of the cam 101 in the direction of feed of the paper, that is, toward the molding machine, is limited by an abutment or stop rod 104 mounted in the side-frames and against which the arms 102 are adapted to bear by reason of the contracting action of spring 103.

Ordinarily, the edge of the knife-blade 94 is above the paper label ribbon in the stationary guide-member 62, but when the sliding carriage on which the knife is mounted reaches the end of its forward stroke, cam 95 comes under cam 101 thus forcing the knife-blade down close to the end of the carriage thus severing the projecting label, the end of the carriage acting as one of the shear elements with which the knife-blade coöperates. During the retraction of the carriage, cam 101 rocks somewhat moving arms 102 away from the stop-rod 104, thus permitting cam 95 to pass easily under it without depressing the cutting blade.

To support the label in proper position preliminary to its application to the batch of dough, I employ a slotted plate 110 through the slot 111 of which the label is adapted to pass, the plate being secured to the front ends of two rods 112 and 113 slidable in bearings in a cross-bar 114 transversely connecting together the side-frames, and in bearings in ears 115 on a plate 116 fastened to the underside of the carriage. Each of these slots is surrounded by a coiled spring 117 adapted to bear at one end against a collar 118 on and pinned to the rod and at its other end against a collar 119 slidable on the rod. Thus, the element 110 has a limited play relative to the other companion parts of the mechanism.

Referring now to the detailed mechanism of the tripping or controlling appliance it will be perceived that the trip-plate or trigger 22 is fastened to a shaft or rod 120 oscillatory in main bearings 200, 200 located at opposite ends and also in spaced bearings 121, 122 of a support 123 hinged to a bracket 124 at 125 for adjustment of the coöperating parts as will be readily understood from the further description. Between these bearings 121, 122 the shaft has a collar 126 fixed thereto and carrying an outstanding arm 127 provided at its end with a handle or knob 128. Loose on the shaft so as to be capable of rocking thereon is a lever 129 equipped with a cam 130 and a beveled, notched catch 131 pivoted at 132, equipped with a handle or finger-piece 133 and a spring 134 tending to rock the catch into operative position, the arm 127 ordinarily residing in the notch of the catch-arm, thus completing an operative rigid connection between the shaft and the cam, whereby the rocking of the former oscillates the latter.

Bracket 124 has three alined bearings 140, 141, and 142 for an oscillatory shaft or rod 143 carrying at its upper portion a cam 144 in coöperative relation with cam 130 and secured to its supporting shaft by an arm 145. This cam 144 is rocked inwardly toward its companion operating cam 130 by a torsional spring 146 surrounding the shaft and having its ends secured respectively to the bracket and to an arm 147 fixed to the shaft.

At 150 shaft 143 has a disengageable connection with the upper round portion of the square shaft 40 and in order to swing or restore the shutter or trip 22 into the path of travel of the batches of dough, after one of them has passed and operated it, a contractile spring 160 is connected to an end of lever 129 and at its other end to the shank of the handle of the joint 150.

Assuming that the drum or cylinder of the molding machine and the grooved pulley 31 of the labeling appliance are constantly rotating, and that the latter is restrained from operating by lever 35 engaging pin or lug 30, and that the other elements are in the positions shown in the drawings, the operation of the apparatus occurs practically as follows. When a batch of dough in its progress or travel through the molding machine arrives at the hinged trip-plate or trigger 22 it will push it back in passing by, thus rocking the shaft 120 and by coacting cams 130, 144 turning the combination shaft 143, 40, thus carrying cam 42 inwardly and by coaction with arm 43 rocking lever 35 releasing lug 30, thereby permitting pulley 31 to turn shaft 28 one complete revolution before which time the trip plate or trigger 22 will have returned to its original position under the action of spring 160 and lever 35 will have come back into the circular path of travel of lug or pin 30, thus insuring that but one complete revolution will be brought about. Such single revolution of shaft 28 through the connecting rod 46 effects a complete reciprocation of the sliding carriage, it being observed that when lever 35 stops the turning of shaft 28 the connecting rod will be in its rearmost position of travel with the wristpin 45 on dead center.

During the advance stroke of the carriage, arm 77 is in its forward position as shown in Figs. 2 and 3, thus permitting shoe 71 to clamp the paper ribbon or label tape between itself and the top face of the carriage bringing about a proper forward feeding of the paper an amount substantially equally the stroke of the carriage, the foremost end of the paper being supported by the apertured member 110. At the proper moment the single advanced label is severed by the coacting parts 94 and 49 and is picked up and caused to adhere to the same traveling batch of dough which tripped the mechanism to bring about its feeding and severance. When the carriage is near the end of its forward movement arm 77 strikes abutment 81 and is shifted or rocked to the left thus lifting shoe 71 through the action of cam 74 which consequently does not grip the paper during the backward stroke. At the end of such retrograde movement, however, arm 77 strikes stop screw 80 and is rocked to depress the shoe on the paper ready for the next advance movement.

To those skilled in this art it will be apparent that the invention is not limited and restricted to the precise and exact details of structure presented but rather that the invention is capable of a variety of embodiments and consequently many minor mechanical changes may be incorporated in the apparatus illustrated and described without departure from the heart and essence of the invention and without the sacrifice of any of its substantial benefits and advantages.

I claim:

1. In a labeling appliance of the character described, the combination of means to feed a continuous strip of labels to position the foremost one in the path of travel of a series of separated batches of dough for application thereto, means to sever said first label from the strip, constantly-acting operating-means for said feeding and severing means, means normally holding said operating-means inactive on said feeding and severing means, and a trip device for said holding means operated by the batches of dough, whereby each batch of dough governs the feeding and cutting off of its own label, substantially as described.

2. In a labeling appliance of the character described, the combination of a sliding carriage, means to reciprocate said carriage, means to grip a continuous strip of labels to said carriage during its forward strokes to intermittently project the foremost label of the strip into the path of travel of a series of separated batches of dough for application thereto and to release said strip during the backward strokes of the carriage, and means to successively sever the foremost label from said strip, whereby each batch of dough has a label applied thereto, substantially as described.

3. In a labeling appliance of the character described, the combination of a sliding carriage, means to reciprocate said carriage, means to grip a continuous strip of labels to said carriage during its forward strokes to intermittently project the foremost label of the strip into the path of travel of a series of separated batches of dough for application thereto and to release said strip during the backward strokes of the carriage, means to successively sever the foremost label from said strip, and a trip device actuated by the batches of dough to render said reciprocating means operative on said carriage, whereby each batch of dough governs the application of its own label thereto, substantially as described.

4. In a labeling appliance of the character described, the combination of a sliding carriage, means to reciprocate said carriage, means to grip a continuous strip of labels to said carriage during its forward strokes to intermittently project the foremost label of the strip into the path of travel of a series of separated batches of dough for application thereto and to release said strip during the backward strokes of the carriage, means operated by the forward travel of the carriage to sever the foremost label from the strip, and a trip device actuated by the batches of dough to render said reciprocating means operative on said carriage, whereby each batch of dough governs the feeding, severance, and application of its own label, substantially as described.

5. The combination of a dough-molder comprising a revoluble drum and an outer band spaced therefrom, and a labeling appliance comprising in coöperative relation, means to feed labels individually in succession into the space between said drum and band through which the separated batches of dough pass, means to operate said feeding means, and tripping means located in said space and actuated by contact of the batches of dough therewith to render said operating-means active on said label feeding means, whereby each batch of dough controls the feeding of its own label, substantially as described.

6. The combination of a dough-molder comprising a revoluble drum and an outer band spaced therefrom, and a labeling appliance comprising in coöperative relation, means to feed labels individually in succession edgewise into the space between said drum and band through which separated batches of dough pass, means to operate said feeding means, and tripping means located in said space and actuated by contact of the batches of dough therewith to render such operating-means active on said label-feeding means, whereby each batch of dough controls the feeding of its own label, substantially as described.

7. The combination of a dough-molder comprising a revoluble drum and an outer band spaced therefrom and a labeling appliance of the character described comprising in coöperative relation, means to feed a continuous strip of labels to position the foremost one in the path of travel of a series of separated batches of dough traversing the space between the drum and band, means to sever such first label from the strip, means to operate said feeding and severing means, and a tripping device located at least in part in the space between said drum and band and acting by contact of the batches of dough therewith to render said operating-means active on said label feeding and severing means, whereby each batch of dough controls the feeding and cutting off of its own label, substantially as described.

8. In a labeling appliance of the character described, the combination of a sliding carriage, means to reciprocate said carriage, means on said carriage to grip a continuous strip of labels thereto during its forward strokes to intermittently project the foremost label of the strip into the path of travel of a series of separated batches of dough for application thereto and to release said strip during the backward strokes of the carriage, means carried by said carriage and operated by its forward travel to sever the foremost label from the strip, and a pivoted trip device actuated by the batches of dough to render said reciprocatory means operative on said carriage, whereby each batch of dough governs the feeding, severance, and application of its own label, substantially as described.

9. In a labeling appliance of the character described, the combination of reciprocating means to feed a continuous strip of labels to position the foremost one in the path of travel of a series of separated batches of dough, a pivoted knife to sever such first label from the strip, constantly-acting power-driven operating-means for said feeding and severing means, a clutch between said operating and feeding and severing means, a lock to hold said clutch inoperative, and a hinged trip device for said lock operated by the batches of dough, whereby each batch of dough governs the feeding and cutting off of its own label, substantially as described.

10. In a labeling appliance of the character described, the combination of a rotary shaft, a sliding carriage, a crank on said shaft, a connecting rod operatively associating together said crank and carriage, a pulley free to revolve on said shaft, a collar fixed to said shaft, a spring forcing said pulley toward said collar, means to lock said collar and shaft against turning, a trip device in the path of travel of and actuated by a series of separated batches of dough to release said locking means, means to cause said carriage to feed forwardly a continuous strip of labels to project the foremost one into the path of travel of said batches of dough for application thereto, and means to sever the foremost label from the strip, whereby each batch of dough governs the feeding, severance, and application of its own label, substantially as described.

11. In a labeling appliance of the character described, the combination of a reciprocatory carriage, means to grip a continuous strip of labels to said carriage during its forward strokes and to release the strip during its backward strokes, whereby the foremost labels are intermittently projected into the path of travel of a series of separated batches of dough, means to operate said carriage, a spring knife on said carriage, a relatively-stationary cam to depress said knife to sever the foremost label, a mounting for said cam permitting it to allow the knife to pass it during its rearward movements without severance of the strip, and a trip device actuated by the batches of dough controlling the operation of said carriage-operating means, whereby each batch of dough controls the feeding, severance, and application of its own label, substantially as described.

BERNARD HAGELE.